May 14, 1968  P. L. SPEICHER  3,383,055
MATERIAL SPREADER
Filed Dec. 9, 1965  2 Sheets-Sheet 1
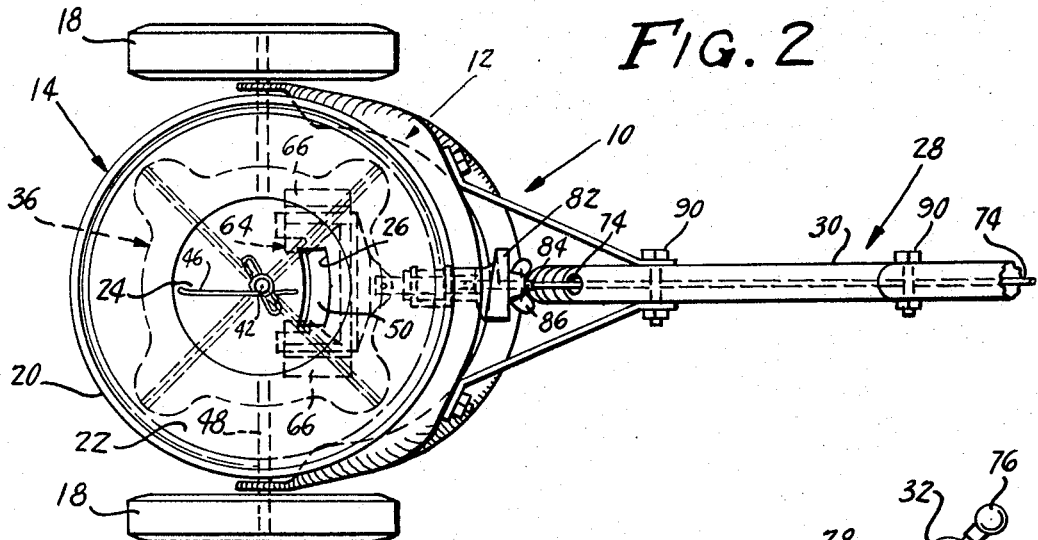
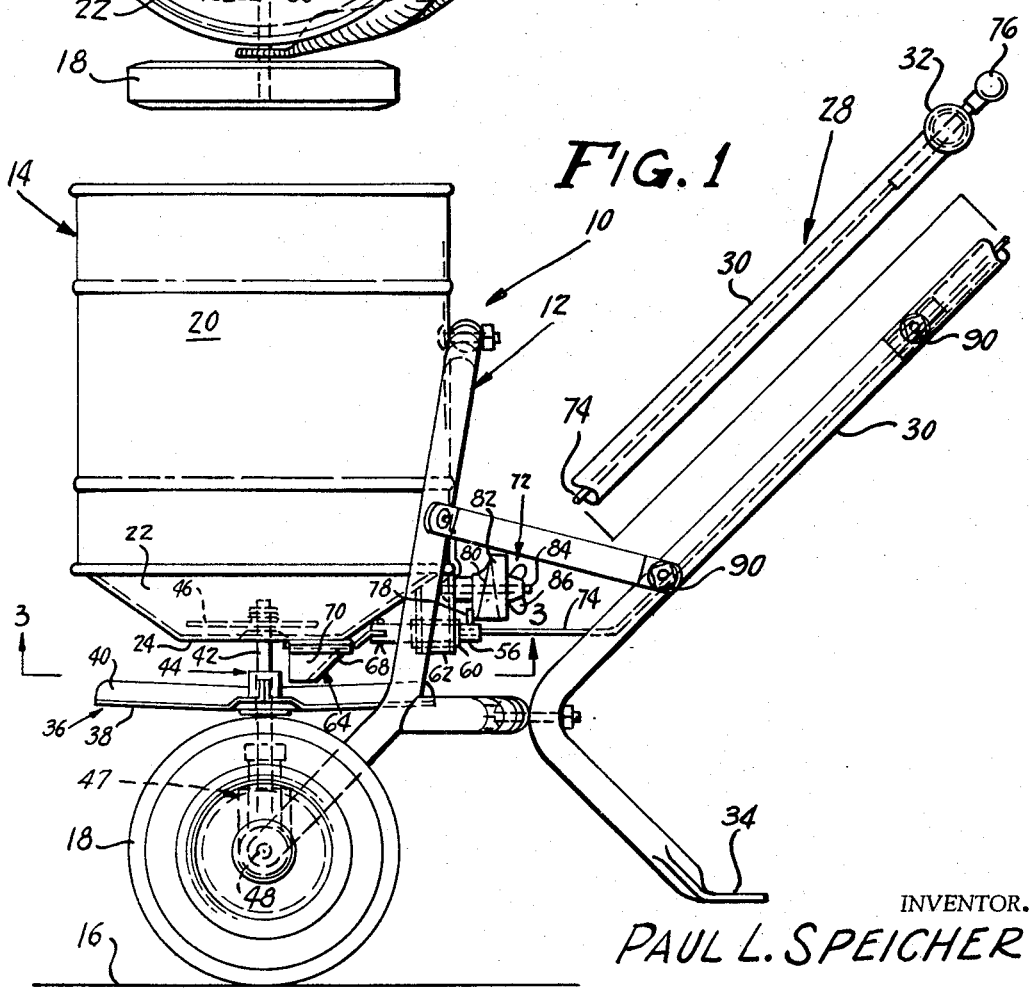
INVENTOR.
PAUL L. SPEICHER
BY Kimmel, Crowell & Weaver
ATTORNEYS.

May 14, 1968  P. L. SPEICHER  3,383,055
MATERIAL SPREADER
Filed Dec. 2, 1965  2 Sheets-Sheet 2
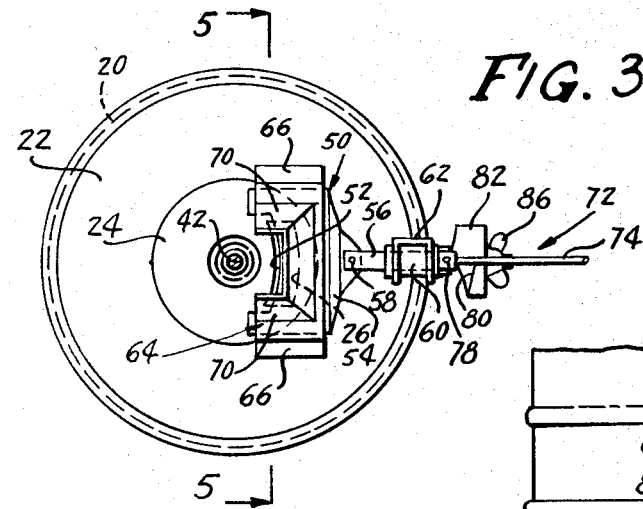
FIG. 3
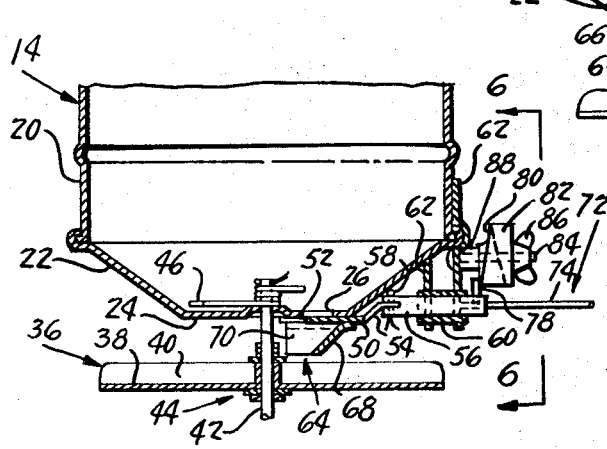
FIG. 6
FIG. 4
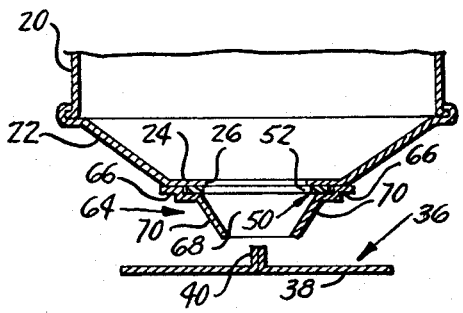
FIG. 5
INVENTOR.
PAUL L. SPEICHER
BY *Kimmel, Crowell & Weaver*
ATTORNEYS.

United States Patent Office 3,383,055
Patented May 14, 1968

3,383,055
MATERIAL SPREADER
Paul L. Speicher, Urbana, Ind., assignor to The Cyclone Seeder Co., Inc., Urbana, Ind., a corporation of Indiana
Filed Dec. 2, 1965, Ser. No. 511,140
5 Claims. (Cl. 239—687)

ABSTRACT OF THE DISCLOSURE

Agricultural broadcasting apparatus including a wheel supported frame mounting a hollow hopper having a bottom wall provided with a material discharge slot offset with respect to the center thereof, a material distributor plate mounted for rotation on the frame below the slot, material guide means disposed intermediate the plate and the hopper bottom wall and being fixedly connected to the latter, the material guide means including a ramp disposed in the direct path of travel of material released through the slot and being downwardly inclined to terminate adjacent to and vertically spaced from the center of the distributor plate, a valve plate slidably mounted on the bottom wall and adjacent portions of the guide means, the valve plate having a normally closed position in which it extends across the material discharge slot, and means on the apparatus selectively operable to move the valve plate to an open position to permit passage of material from the hopper through the slot to fall on the ramp for guided discharge to selected portion of the distributor plate.

---

This invention relates to material spreaders, and more particularly to a spreader of the type having a rotatably mounted material spreading disc under a material discharge opening whereby pulverant material is received from a hopper and discharged onto an area adjacent the spreader.

Broadcast spreaders are well known in the art and generally comprise a hopper mounted on one or more ground engaging wheels with a rotatable disc mounted under the hopper for receiving pulverant material therefrom. A valve plate is generally mounted beneath the material discharge opening to control the flow of material onto the rotating disc. The types of valve plates known in the prior art may be categorized as of the outwardly opening type, by which is meant that the opening produced by the material discharge opening and valve plate becomes larger when the valve plate is moved outwardly, and of the inwardly opening type, by which is meant that the opening produced by the material discharge opening and valve plate becomes larger when the valve plate is moved inwardly. The utilization of an inwardly opening type valve plate results in a more uniform deposition of pulverant material onto the surrounding area, as is shown by my United States Patent 2,882,060.

Valve plates utilized in prior art broadcast spreaders may be further characterized as being of the oscillatible type in which the valve plate is manipulated transverse to the direction of spreader movement to control the point at which the pulverant material contacts the rotating disc, one example being shown in my United States Patent 2,843,387. In the non-oscillatible type of value plate, the opening through which pulverant material flows may be adjusted for various flow rates, but when set in position, it remains of substantially constant size and position. Generally the proper use of an oscillatible type of valve plate results in a uniform material deposition.

There has been proposed a broadcast spreader utilizing an outwardly opening on-oscillatible type valve plate. In testing this spreader, it has been found that pulverant material is unevenly cast from the rotating disc resulting in non-uniform application. It will be apparent that the use of such a spreader with seed, fertilizer or weed control material will result in a patchwork appearance in the due course of time.

It is an object of the instant invention to provide a broadcast spreader of the type utilizing an outwardly opening valve plate which will uniformly spread pulverant material onto the surrounding surface.

Another object of the instant invention is to provide a broadcast spreader of the type described which utilizes a minimum number of moving parts to effect uniform deposition.

Still another object of the instant invention is to provide a broadcast spreader utilizing an outwardly opening non-oscillatible valve plate in conjunction with a ramp positioned under the material discharge opening to control the point at which the pulverant material contacts the rotating disc thereby promoting the uniform deposition of pulverant material adjacent the spreader.

A further object of the instant invention is to provide a broadcast spreader utilizing a non-oscillatible outwardly opening valve plate in conjunction with a ramp for depositing the pulverant material onto the rotating plate such that the material strikes the plate at an angle inclined toward the center.

Still another object of the instant invention is to provide a pulling mechanism for opening the outwardly opening valve plate in conjunction with a blocking surface facing the spreader for contacting a protuberance on an extension of the valve plate.

Still another object of the instant invention is to provide a broadcast spreader which is inexpensive to manufacture, assemble and maintain and which utilizes a minimum number of moving parts.

Other objects and advantages of the instant invention, as well as the invention itself, reside in the combinations of elements, arranagements of parts and features of construction and operation, all of which will be more fully pointed out hereinafter and disclosed in the accompanying drawings wherein there is shown a preferred embodiment of this inventive concept.

In the drawings:
FIGURE 1 is a side elevational view of the broadcast spreader of the instant invention;
FIGURE 2 is a top plan view of the broadcast spreader of FIGURE 1;
FIGURE 3 is a horizontal cross-sectional view of the broadcast spreader of FIGURES 1 and 2, taken substantially along line 3—3 of FIGURE 1 as viewed in the direction of the arrows;
FIGURE 4 is a partial vertical longitudinal cross-sectional view of the broadcast spreader of FIGURES 1 and 2 illustrating the relationship of the hopper, material discharge opening, valve plate, ramp and rotating disc;
FIGURE 5 is a partial vertical transverse cross-sectional view of the material discharge spreader showing another view of the relationship between the hopper, material discharge opening, ramp and rotating disc; and
FIGURE 6 is a partial rear view of the material discharge spreader of the instant invention as may be seen from along line 6—6 of FIGURE 4 as viewed in the direction of the arrows.

General and conventional construction

Referring now to the drawings in detail, wherein like reference characters designate like elements throughout the several views thereof, and more particularly to FIGURES 1 and 2, there is indicated generally at 10 the material spreader of the instant invention having as its major components a conventional frame shown generally at 12 which may be of any suitable configuration, such as the placement of wheels on a hopper through the intermediary of legs, to which is fixedly secured a hopper designated generally at 14 supported on an underlying surface 16 by a pair of ground engaging wheels 18, although any number of wheels may be used. Hopper 14 is of conventional construction and includes a material storage portion 20 in communication with a funnel 22, which is illustrated as an inverted frustum of a cone but which may be of any suitable shape, closed at the lower end thereof by a bottom wall 24 in which is formed a material discharge opening or slot 26.

A rearwardly extending handle shown generally at 28 is affixed to frame 12 and includes a substantially straight section 30 carrying a cross bar 32 at the upper end thereof with the lower end of section 30 forming a ground support 34 such that spreader 10 may be tilted rearwardly during periods of non-use. Although section 30 is illustrated as tubular, it should be understood that it may be of angle iron, plate steel or any other structural element. It will be apparent that cross bar 32 may be utilized to steer spreader 10 in the handpowered embodiment shown, but it should be understood that spreader 10 may be self-propelled or mounted on a vehicle thus obviating the necessity of handle 28.

A material spreading disc shown generally at 36 is positioned under material discharge opening 26 and includes a plate 38 provided with a plurality of upstanding flanges 40 extending radially from the center thereof. Disc 36 is fixedly mounted on a vertical shaft 42 by any suitable connecting means such as that shown generally at 44 in FIGURES 1 and 4. The upper end of shaft 42 is rotatably mounted in bottom wall 24 of hopper 14 and may be provided with an agitator 46 that acts to insure free flowing movement of the pulverant material within hopper 14.

A driven means shown generally at 47 in FIGURE 1 interconnects an axle 48 in the lower end of shaft 42 for rotating disc 36 upon the advance of rollable wheels 18. It will be apparent that driving means 46 is convenient in the handpowered spreader illustrated, but it should be understood that shaft 42 and disc 36 may be rotated in any manner convenient.

*Valve plate and ramp*

Referring now to FIGURES 3 to 6 inclusive, a valve plate shown generally at 50 is mounted under bottom wall 24 and includes a cutout 52 communicating with the inner edge of plate 50 with cutout 52 facing shaft 42. Valve plate 50 is movable from a first closed position with cutout 52 being positioned inwardly of slot 26 to a second position, outwardly from the first position such that slot 26 and cutout 52 are aligned providing for the flow of pulverant material therethrough.

In order to undergo the movement described, valve plate 50 is provided with an angled bracket 54 received in the bifurcated end of a rod 56 and secured therein by a cotter key 58 or the like. Rod 56 is slidably mounted in a sleeve 60 which is supported from hopper 14 by a pair of brackets 62. It will be apparent that a pull or push on rod 56 will result in movement of valve plate 50. It will be seen that the valve plate described is of the outwardly opening type resulting in the feed of material onto rotating disc 36 in a known fashion.

Positioned under cutout 52 and slot 26 is a chute shown generally at 64 including a pair of brackets 66 secured to the underside of hopper 14 and providing a ledge on which valve plate 50 rests. Connected between brackets 66 is an inwardly inclined ramp 68 having its upper edge disposed outwardly of the outermost limit of slot 26 and with the lower edge thereof spaced slightly above the upper most extent of flanges 40 on disc 36. It will be readily apparent that material flowing through slot 26 and cutout 52 will be deflected by ramp 68 toward the center of disc 36 with the pulverant material contacting disc 36 at an angle directed toward the center thereof in order to enhance more uniform deposition of the pulverant material adjacent the spreader. As an additional feature, a pair of forwardly extending downwardly inclined walls 70 act to concentrate the flowing material into a relatively small area on disc 36 as may be seen in FIGURE 5.

*Material flow control*

It will be readily apparent that the extent of outward movement of valve plate 50 controls the effective size of the opening produced by slot 26 and cutout 52 consequently controlling the flow rate of material from hopper 14. In order to provide a simple and convenient means of controlling the rate of material flow, a material flow control mechanism shown generally at 72 is provided.

Control mechanism 72 includes a stiff wire 74 affixed to the end of slidable rod 56 and which is threaded through hollow tube 30 of handle 28 to exit adjacent cross bar 32. A control knob 76 is affixed to the end of wire 74 to provide a convenient rod pulling means. A protuberance 78 is provided on slidable rod 56 for engaging a blocking surface 80 which is conveniently formed as a screw onto a rotatable member 82 mounted on a shaft 84 with a wing nut 86 providing for releasably abutting rotating member 82 against a fixed bushing 88 surrounding shaft 84.

A handy feature of the instant invention resides in the threading of the lower end of protuberance 78 and complementarily threading a transverse opening in slidable rod 56 such that protuberance 78 may act as a set screw for retaining wire 74 in a longitudinal opening in slidable rod 56.

As may be seen in FIGURE 1, a plurality of transverse bolts 90 extend through tube 30 securing cross braces of frame 12 to handle 28 and securing telescoping components of handle 28 together. It has been found that the presence of bolts 90 within tube 30 results in a sufficient frictional holding of wire 74 such that longitudinal movement thereof is effectively precluded. Accordingly, rod 56 is securely held in collar 60 thus establishing a constant effective material discharge aperture in accordance with the setting blocking surface 80.

It is now seen that there is herein provided an improved material spreader having all of the objects of this invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:

1. A spreader for broadcasting pulverant material comprising:
   a movably mounted hopper having a normally horizontal bottom wall provided with a material discharge opening extending transversely therethrough and disposed intermediate the center and outer periphery of said bottom wall;
   an upright shaft journalled for rotation on said bottom wall and having a portion depending therebelow;
   a normally horizontal material distributor plate fixedly connected to said shaft portion in vertically spaced relation relative to said bottom wall and having a portion thereof constantly confronting said opening and consequently being disposed in the path of pulverant material discharged through said opening;
   means on said spreader and connected in driving relationship with said shaft to effect rotation thereof;
   chute means connected on said bottom wall and depending therefrom, said chute means including a downwardly inclined ramp having its upper edge fixedly secured to said bottom wall adjacent to but spaced outwardly from the outermost edge of said slot, said ramp having its lower edge extending in the direction of said shaft and terminating above said plate, said ramp being disposed intermediate said distributor plate and said slot to receive thereon material discharged from said slot and to deflect said material therefrom and onto said plate in the direction of said shaft;

ledge means formed on said chute intermediate said ramp and said bottom wall and disposed in vertically spaced relation relative to said bottom wall;

a valve plate slidably mounted on said ledge means adjacent said bottom wall and having a first position extending completely across said slot to close the same; and selectively adjustable means connected with said plate to effect movement thereof outwardly from the center of said bottom wall to a fully open second position and in so moving to expose an increasingly greater deflection area of said ramp to the material discharged through said slot.

2. The spreader of claim 1 wherein the ramp is of greater transverse dimension at the top than at the bottom.

3. The spreader of claim 2 including an angled wall formed on each lateral side of the ramp angled toward and facing the center of the plate.

4. The spreader of claim 3 wherein said selectively adjustable means comprises:
a rod secured to the valve plate;
a protuberance on the rod;
a relatively movable blocking surface, facing the hopper and engaging the protuberance, for precluding outward movement of the protuberance beyond the surface; and
means for pulling the rod outwardly from the hopper.

5. The spreader of claim 4 wherein the blocking surface is formed as a screw.

References Cited

UNITED STATES PATENTS

| | | | |
|---|---|---|---|
| 364,005 | 5/1887 | Freeman | 239—687 |
| 402,150 | 4/1889 | Eberhart et al. | 239—687 |
| 1,751,928 | 3/1930 | Lachner | 239—687 |
| 2,843,387 | 7/1958 | Speicher | 239—73 |
| 2,882,060 | 4/1959 | Speicher | 239—687 |

OTHER REFERENCES

John Deere 300 Spin Spreader, Operator's Manual OM–M19115M, received 8/17/1964, pp. 2, 10, 15, 17, 19, 21.

EVERETT W. KIRBY, *Primary Examiner.*

UNITED STATES PATENT OFFICE
CERTIFICATE OF CORRECTION

Patent No. 3,383,055

May 14, 1968

Paul L. Speicher

It is certified that error appears in the above identified patent and that said Letters Patent are hereby corrected as shown below:

Column 4, lines 57, 65 and 67, "opening", each occurrence, should read -- slot --. Column 6, line 1, the claim reference numeral "3" should read -- 1 --.

Signed and sealed this 17th day of March 1970.

(SEAL)
Attest:

Edward M. Fletcher, Jr.
Attesting Officer

WILLIAM E. SCHUYLER, JR.
Commissioner of Patents